United States Patent
Kujala (10) Patent No.: US 9,312,906 B2
(45) Date of Patent: Apr. 12, 2016

(54) HOUSING ASSEMBLY

(71) Applicant: HERE Global B.V., Veldhoven (NL)

(72) Inventor: Pertti Kalevi Kujala, Martinniemi (FI)

(73) Assignee: HERE Global B.V., Veldhoven (NL)

( * ) Notice: Subject to any disclaimer, the term of this patent is extended or adjusted under 35 U.S.C. 154(b) by 3 days.

(21) Appl. No.: 14/171,013

(22) Filed: Feb. 3, 2014

(65) Prior Publication Data

US 2015/0222314 A1 Aug. 6, 2015

(51) Int. Cl.
*H04M 1/00* (2006.01)
*H04B 1/3888* (2015.01)
*B22C 9/00* (2006.01)

(52) U.S. Cl.
CPC ............... *H04B 1/3888* (2013.01); *B22C 9/00* (2013.01)

(58) Field of Classification Search
CPC ............ H04M 1/0216; H04M 1/0214; H04M 1/0229; H04M 1/0247; H04M 1/0218; H04M 1/0237; H04M 1/0239; H04M 1/0212
USPC ...................................................... 455/475.8
See application file for complete search history.

(56) References Cited

U.S. PATENT DOCUMENTS

| | | | | |
|---|---|---|---|---|
| 5,905,796 A * | 5/1999 | Jung | ............... | H04M 1/0216 16/303 |
| 7,286,861 B2 * | 10/2007 | Woo | ............... | H04B 1/38 379/433.13 |
| 2008/0053851 A1 * | 3/2008 | Ko | ............... | A45C 11/00 206/320 |
| 2012/0169668 A1 | 7/2012 | Lin et al. | | |
| 2012/0321377 A1 | 12/2012 | Fang | | |
| 2013/0165190 A1 | 6/2013 | Ko et al. | | |

FOREIGN PATENT DOCUMENTS

TW M437031 U 9/2012

OTHER PUBLICATIONS

"Review: Nokia Lumia 800 Soft Cover", http://ukmobilereview.com/2012/05/nokia-lumia-800-soft-cover/, Jan. 16, 2014, 4 pgs.

* cited by examiner

*Primary Examiner* — Kwasi Karikari
(74) *Attorney, Agent, or Firm* — Lempia Summerfield Katz LLC (57) ABSTRACT

A method including bending an electronic apparatus housing member, where the housing member is a substantially rigid one-piece member, where the bending comprises a bending jig bending the housing member from a first shape to a second shape, where the bending elastically bends the housing member to form an electronic component path of insertion into the housing member through a front aperture of the housing member, where a shape of the front aperture is changed by the bending; inserting an electronic component assembly as a singular module into the housing member through the path; and allowing the housing member to resiliently deflect back to the first shape, where the housing member substantially closes the path.

20 Claims, 6 Drawing Sheets

HOUSING ASSEMBLY

BACKGROUND

1. Technical Field

The exemplary and non-limiting embodiments relate generally to a housing for an apparatus and, more particularly, to connection of the housing with another component of the apparatus.

2. Brief Description of Prior Developments

Devices, such as a mobile telephone for example, are provided with a housing made from connection of multiple members together to form an assembly. Structures of mobile devices are becoming more and more complicated. Also, industrial design requirements are getting higher; requiring a more solid look and feel, as well as using less material and fewer part splits. These higher industrial design requirements are a challenge with conventional assembly methods and assembly structures.

SUMMARY

The following summary is merely intended to be exemplary. The summary is not intended to limit the scope of the claims.

In accordance with one aspect, an example method comprises bending an electronic apparatus housing member, where the housing member is a substantially rigid one-piece member, where the bending comprises a bending jig bending the housing member from a first shape to a second shape, where the bending elastically bends the housing member to form an electronic component path of insertion into the housing member through a front aperture of the housing member, where a shape of the front aperture is changed by the bending; inserting an electronic component assembly as a singular module into the housing member through the path; and allowing the housing member to resiliently deflect back to the first shape, where the housing member substantially closes the path.

In accordance with another aspect, an example embodiment is provided in an apparatus comprising a housing comprising a one-piece member having a first aperture therethrough into a receiving area inside the housing; and an electronic component assembly located inside the housing, where the electronic component assembly is larger than the first aperture, where the electronic component assembly is inserted into the receiving area through the first aperture as a singular module, where the one-piece member is substantially rigid, and where the one-piece member was resiliently bent in a bending jig to change a shape of the first aperture from a first shape to a different second shape for insertion of the electronic component assembly into the first aperture and the one-piece member was released to allow the one-piece member to resiliently bend back such that the first aperture has the first shape to capture the electronic component assembly in the receiving area and prevent the electronic component assembly from exiting the first aperture.

In accordance with another aspect, an example method comprises bending an electronic apparatus housing, where the housing is substantially rigid, where the bending comprises a bending jig bending the housing from a first shape to a second shape, where the bending elastically bends the housing to form an electronic component path of insertion into the housing through a front aperture of the housing, where a shape of the front aperture is resiliently changed by the bending, where the housing comprises a one-piece member forming a unibody including a back, a front and sides between the back and the front with no hinges and which forms an internal electronic component receiving area; inserting an electronic component assembly as a singular module into the housing through the path; and allowing the housing to resiliently deflect back to the first shape, where the housing substantially closes the path, where the electronic component assembly is larger than the front aperture in the first shape of the housing such that the housing prevents full insertion or removal of the electronic component assembly with at the receiving area without the bending of the housing into the second shape.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1:
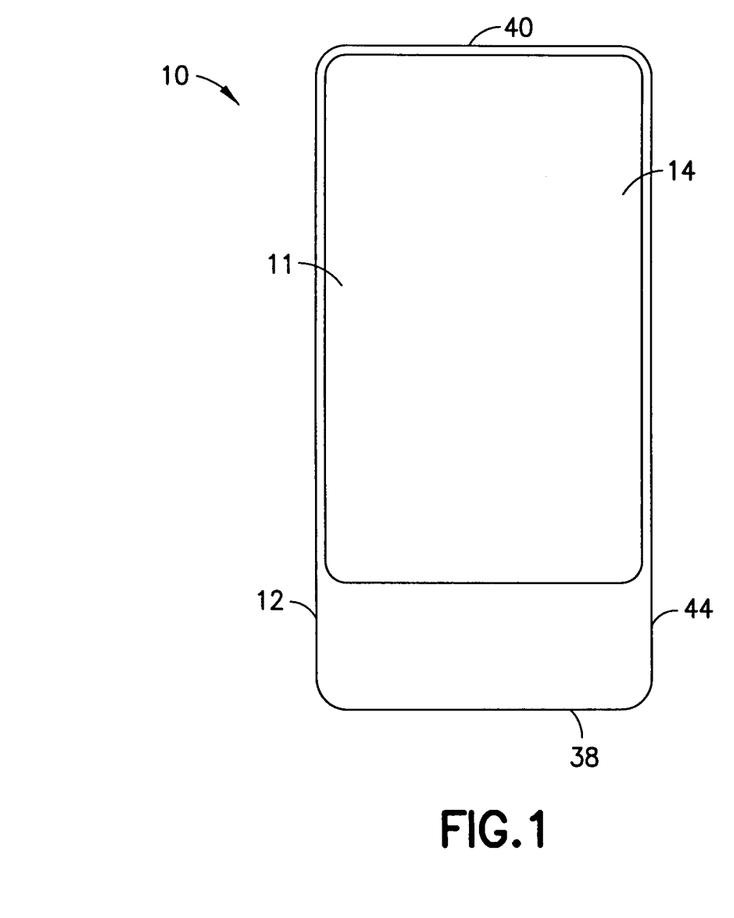
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Figure 2:
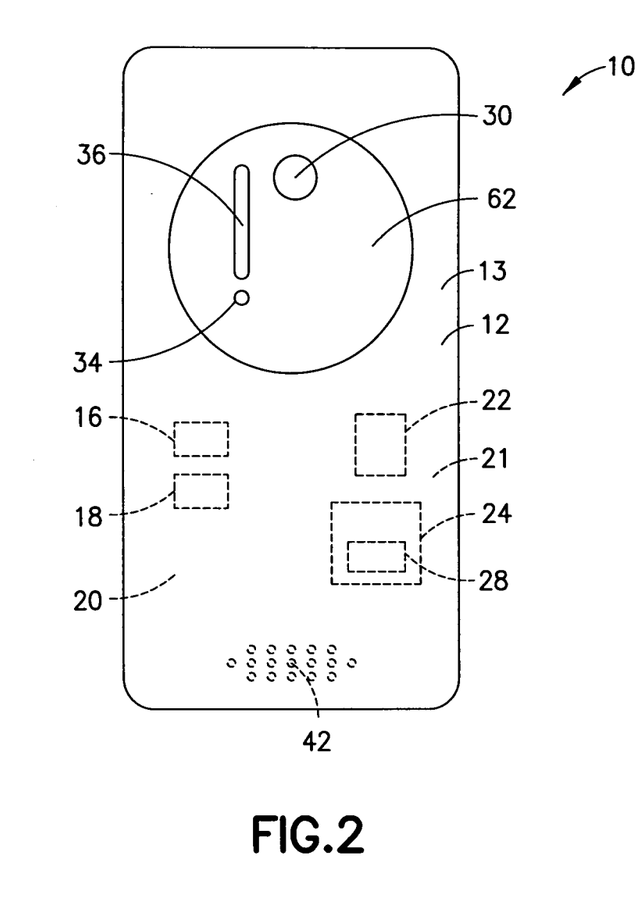
FIG. 2 is a rear view of the apparatus shown in FIG. 1.

Referring also to FIG. 2, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example or a local area network.

In this example, the apparatus 10 includes the camera 30 which is located at the rear side 13 of the apparatus, an LED 34, and a flash system 36. The apparatus may also comprise a front camera. The LED 34 and the flash system 36 are provided for the camera 30. The camera 30, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

Figure 3:
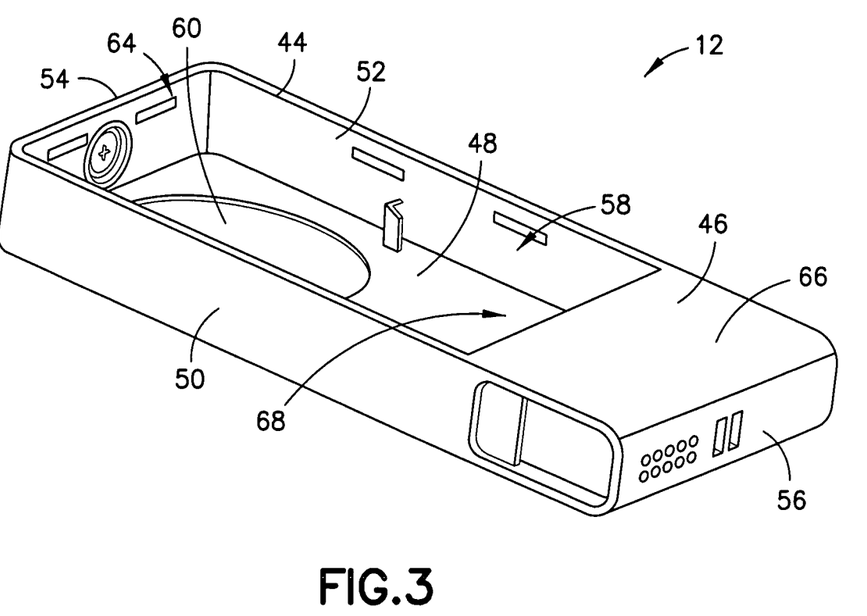
FIG. 3 is a perspective view of the one-piece housing member shown in FIGS. 1-2.

Referring also to FIG. 3, a perspective view of the housing 12 is shown. In this example the housing 12 comprises a one-piece member 44 made of a plastic or metal material. The one-piece member 44 is substantially rigid. In this example the one-piece member 44 comprises walls forming a front 46, a back 48, two lateral side walls 50, 52, a top 54 and a bottom 56. The one-piece member 44 forms an internal electronic component receiving area 58. Additional members may be connected to the one-piece member 44 to form the housing 12.

Figure 4:
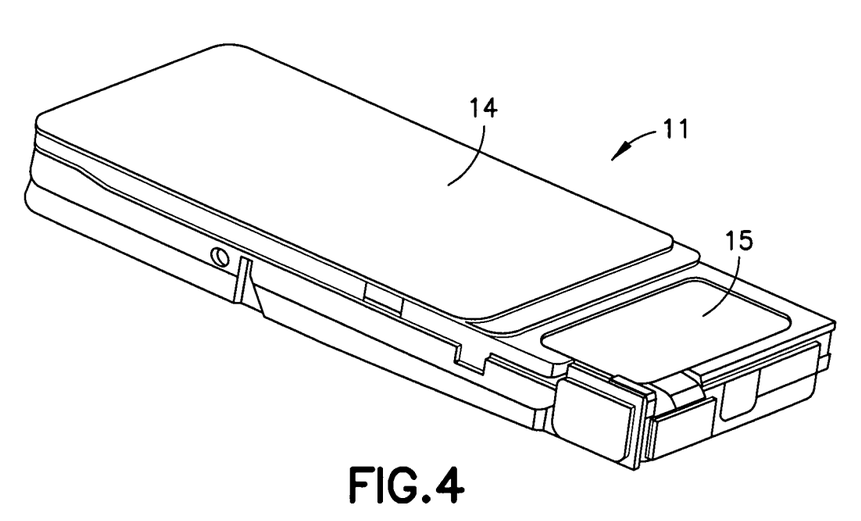
FIG. 4 is a perspective view of an electronic component chassis of the apparatus shown in FIGS. 1-2.

Referring also to FIG. 4, in this example a majority of the electronic components are provided as a singular chassis 11 which is inserted into the housing 12 as a singular module. The chassis 11 includes the display 14 in this example.

Referring back to FIG. 3, in this example the back 48 has an aperture 60 for a portion 62 (SEE FIG. 2) of the chassis 11 to extend into. The front 46 has a front aperture 64 and a bottom portion 66 extending between the lateral sides 50, 52 at the bottom side of the front aperture 64. The portion 66 with the receiving area 58 forms an undercut 68 beneath the portion 66. The undercut 68 receives a bottom portion 15 of the chassis 11. The front aperture 64 has the display 14 located therein.

As noted above, the one-piece member 44 is substantially rigid. The chassis 11 is also substantially rigid. In the natural state of the one-piece member 44, none of the apertures in the one-piece member 44 are large enough to allow the chassis 11 to be fully inserted into the receiving area 58. Features as described herein allow for the substantially rigid one-piece member 44 to deform to allow the chassis 11 to be inserted into the receiving area 58. The deformation is not sufficient to cause any significant permanent deformation. The deformation is temporary, and the deformation is resilient to allow the one-piece member 44 to return to its natural state after the chassis 11 is inserted. After the chassis 11 is inserted into the receiving area 58, and after the one-piece member 44 returns to its natural shape, the one-piece member 44 prevents the chassis 11 from being removed from the receiving area while the one-piece member is in its natural shape.

Figure 5:
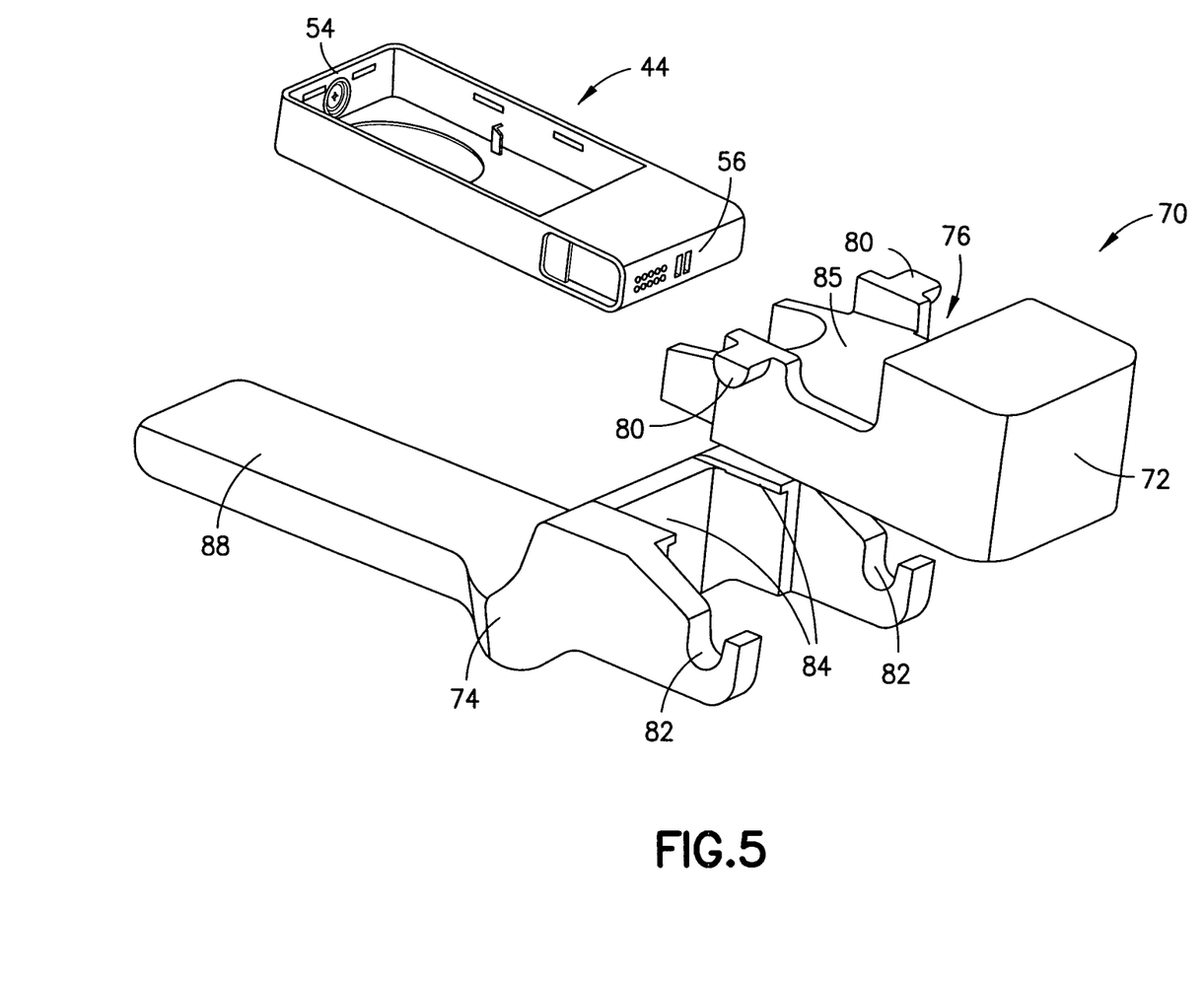
FIG. 5 is a perspective view of a bending jig and the one-piece housing member shown in FIG. 3.
Figure 6:
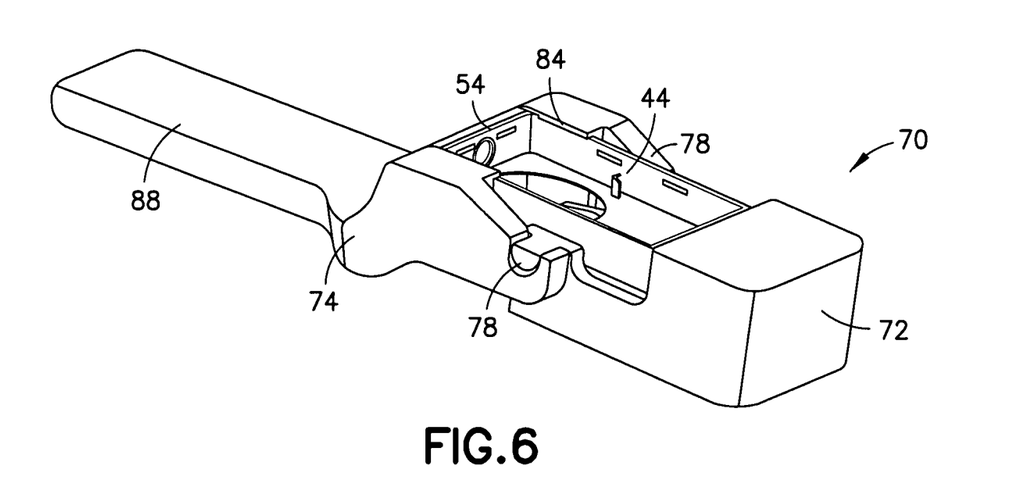
FIG. 6 is a perspective view of the bending jig with the one-piece housing member initially set up for subsequent bending.

Referring also to FIG. 5, the one-piece member 44 is shown with a bending jig 70. The jig 70 comprises a first member 72 and a second member 74. The jig 70 is used to temporarily bend the one-piece member 44 to allow for insertion of the chassis 11 into the receiving area 58. Referring also to FIG. 6, the first member 72 comprises a receiving area 76 which is configured to receive the bottom 56 of the one-piece member 44. The bottom 56 is slid into the area 76, and the area 76 is sized and shaped to restrain movement of the bottom 56 during the bending process. After the bottom 56 is inserted into the receiving area 76, the second member 74 is mounted onto the top 54 of the one-piece member 44 and the two members 72, 74 are joined at pivot joints 78 formed by projections 80 and C-shaped pockets 82. The second member 74 has surfaces 84 which contact the front side 46 of the one-piece member 44 proximate the top 54. The first member 72 has a surface 85 which contacts the back side 48 of the one-piece member proximate the bottom 56. The surface 85, in this example, has a shape with a recess similar to the bottom part of the aperture 60 in the back 48. The one-piece member 44 is, thus, initially loaded into the bending jig.

Figure 7:
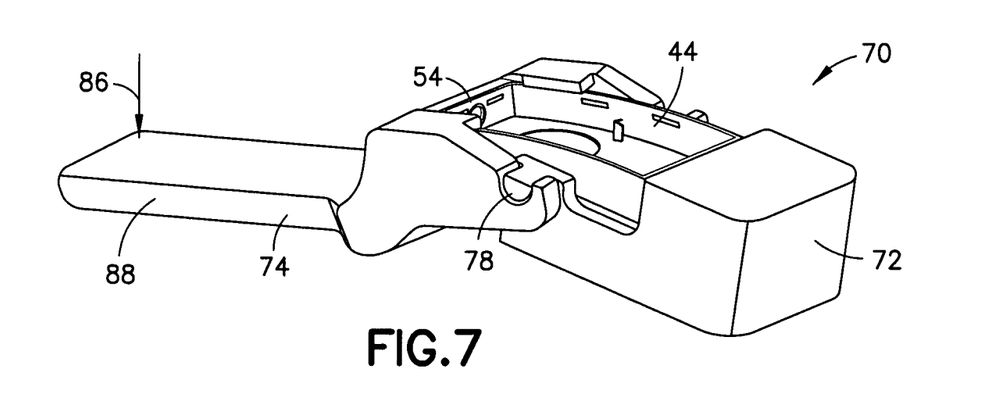
FIG. 7 is a perspective view of the bending jig with the one-piece housing member as in FIG. 6 with the jig bending the one-piece housing member.

Referring also to FIG. 7, a force 86 is then applied to the extension 88 of the second member 74. This force 86 causes the second member 74 to pivot relative to the first member 72 at the pivot joints 78. Because of the restraining contact of the bottom 56 at the receiving area 76 of the first member 72, and top 54 at the surfaces 84, the pivoting of the second member 74 relative to the first member 72 causes the one-piece member 44 to bend. The bending is merely temporary and results in a non-permanent deformation of the lateral sides 50, 52 and the back 48 proximate the relatively large aperture 60.

Figure 8:
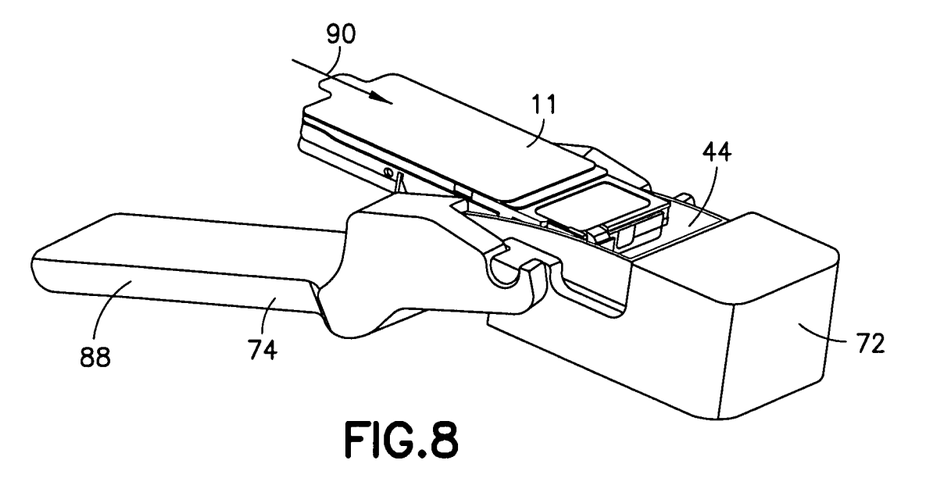
FIG. 8 is a perspective view of the bending jig with the one-piece housing member as in FIG. 7 showing insertion of the chassis into the one-piece housing member.

Referring also to FIG. 8, the temporary deformation of the substantially rigid one-piece member 44 results in a change in shape of the front aperture 64. In particular, in the normal shape of the one-piece member 44, the front aperture 64 is a substantially flat planar aperture. However, when the one-piece member 44 is bent as shown in FIGS. 7-8 in the bending jig 70, the shape of the front aperture 64 is changed to a larger curved aperture. The curved aperture forms a new path of insertion into the one-piece member 44 through the front aperture to allow for full insertion of the chassis 11 into the receiving area 58, as indicated by arrow 90, which would otherwise not be present without the bending.

Figure 9:
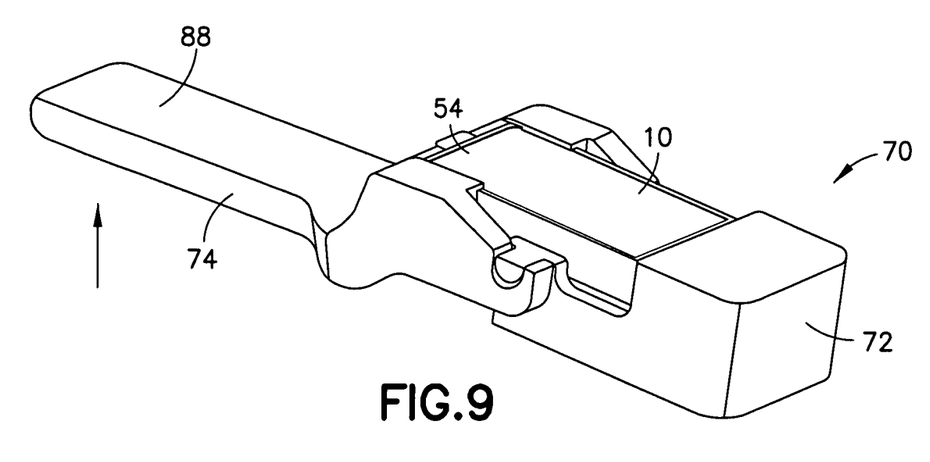
FIG. 9 is a perspective view of the bending jig, one-piece housing member, and chassis as in FIG. 7 after full insertion of the chassis and release of the one-piece housing member from its temporary deformation.

Once the chassis 11 is fully inserted into the one-piece member 44, the extension 88 may be released as indicate by FIG. 9. The one-piece member 44 will then resiliently return to its normal undeflected shape. As the one-piece member 44 returns to its normal undeflected shape, the top 54 of the one-piece member 44 moves back into the path of insertion and effectively closes the path of insertion. Thus, the front aperture 64 becomes too small for the chassis 11 to be removed from the receiving area 58. The chassis 11 is, thus, captured inside the one-piece member 44.

Features as described herein may be used to provide a mechanical housing (such as a unibody having a front side for example) that is able to receive an internal chassis into the volume of the housing. The dimensions of the internal chassis are such that it cannot be placed into the housing without some manipulation of the housing. A portion of the internal chassis may occupy the volume adjacent to an undercut area. Features may be used to allow the volume (space) adjacent to the undercut area to be occupied by a chassis that would normally not be able to occupy such a space unless it were otherwise subdivided into multiple parts.

Unlike a flexible cover, the one-piece member 44 is substantially rigid; not flexible. A flexible cover is able to be fitted by stretching the cover and does not provide mechanical support and is for aesthetic purposes mainly.

Features as described herein may use a bending jig that is able to deform a substantially rigid housing so that an internal chassis may be inserted. Features may be used with bending the housing, temporarily, so as to insert an internal chassis and then release the force so the housing then at least partially covers the internal chassis. The housing structurally may comprise a substantially rigid housing with a volume beneath a front side of the housing (the undercut portion). The undercut may be at least 20% of the total front side of the housing. The internal chassis may have a length and depth substantially a same as the housing. The internal chassis may be inserted through the aperture in the front side. The internal chassis may or may not have a display.

When a mobile device cover becomes complicated, such as with a deep undercut for example, it may not be possible to use a simple 'top-down' or 'tilting' assembly method. So, inner parts or inner assembly of a device cannot easily be assembled into such a cover body. Features as described herein may it possible to assemble inner parts, or assembled inner package, into a complicated shape cover. Earlier full size inner part or assemblies could not be assembled inside a cover having a deep undercut.

With features as described herein, an outer cover of a device may be bent by using bending jig. That makes it possible to slide full size parts and assemblies into the cover through an existing aperture in the cover. The cover may be placed into a bending jig, some force is applied to the jig, and the jig bends a cover to temporarily change the shape of the aperture. Once the cover is in bent and held in that position/shape, then the full internal size parts or assemblies can be slid into the cover through the changed shape of the aperture. When the bending force is released, the cover may spring back to its original shape, and the assembly is ready. The bending jig may be used to bend the cover part. The jig may have a recess for receiving one end of the cover part, and a bending arm of the jig any be rotated to bend another end of cover part. The method is simple and makes it possible to assemble a full size part inside a complicated cover part having a deep undercut. There is no need to split the components of the chassis into split portions.

Figure 10:
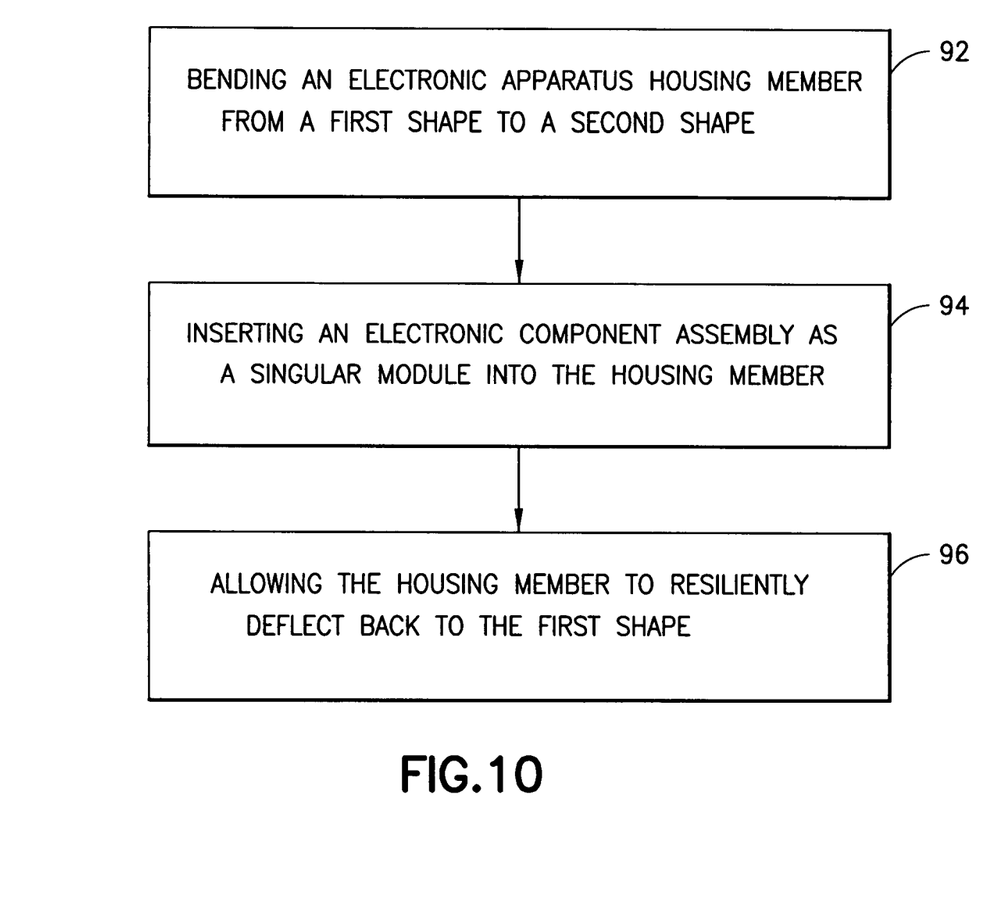
FIG. 10 is a diagram illustrating an example method.

Referring also to FIG. 10, an example method may comprise bending an electronic apparatus housing member as indicated by block 92, where the housing member is a substantially rigid one-piece member, where the bending comprises a bending jig bending the housing member from a first shape to a second shape, where the bending elastically bends the housing member to form an electronic component path of insertion into the housing member through a front aperture of the housing member, where a shape of the front aperture is changed by the bending; inserting an electronic component assembly as a singular module into the housing member through the path as indicated by block 94; and allowing the housing member to resiliently deflect back to the first shape as indicated by block 96, where the housing member substantially closes the path.

The shape of the front aperture in the first shape of the housing member may be substantially planar, and the shape of the front aperture in the second shape of the housing member may be curved. Opposite lateral sides of the housing member in the first shape of the housing member may be substantially parallel and straight, and the opposite lateral sides in the second shape of the housing member may be curved. The bending may comprise no hinges on the housing member allowing the housing member to bend from the first shape to the second shape. The housing member may comprise a front side where the front aperture extends 80 percent or less along a length of the front side, and where opposite lateral sides of the housing member extend substantially uninterrupted along opposite lateral sides of the front aperture, where the opposite lateral sides of the housing member are bent during the bending. The one-piece member may be a unibody having a front side with the front aperture, a rear side, opposite lateral sides and opposite top and bottom sides, where the bending comprises bending the opposite lateral sides. The rear side may have a back aperture therethrough, and where the bending bends the one-piece member at the back aperture. The one-piece member may comprise a front side portion at a front side of the one-piece member located at an end of the front aperture, and where the bending is located spaced from the front side portion.

In one type of example, an apparatus may be provided comprising a housing comprising a one-piece member having a first aperture therethrough into a receiving area inside the housing; and an electronic component assembly located inside the housing, where the electronic component assembly is larger than the first aperture, where the electronic component assembly is inserted into the receiving area through the first aperture as a singular module, where the one-piece member is substantially rigid, and where the one-piece member was resiliently bent in a bending jig to change a shape of the first aperture from a first shape to a different second shape for insertion of the electronic component assembly into the first aperture and the one-piece member was released to allow the one-piece member to resiliently bend back such that the first aperture has the first shape to capture the electronic component assembly in the receiving area and prevent the electronic component assembly from exiting the first aperture.

The shape of the first aperture in the first shape may be substantially planar, and the shape of the first aperture in the second shape is curved. Opposite lateral sides of the one-piece member may be substantially parallel and straight, and the opposite lateral sides are configured to curve when the one-piece member may be bent. The one-piece member may comprise no hinges which allow the one-piece member to bend. The one-piece member may comprise a front side where the first aperture extends 80 percent or less along a length of the front side, and where opposite lateral sides of the one-piece member extend substantially uninterrupted along opposite lateral sides of the first aperture, where the opposite lateral sides of the housing member are resiliently bent for insertion of the electronic component assembly. The one-piece member may be a unibody having a front side with the first aperture, a rear side, opposite lateral sides and opposite top and bottom sides, where the one-piece member is configured to bend at the opposite lateral sides to change the first aperture between the first and second shapes. The rear side may have a back aperture therethrough, and where the bending bends the one-piece member at the back aperture. The one-piece member may comprise a front side portion which extends between opposite lateral side walls of the one-piece member, where the front side portion comprises at least 20 percent of a front side of the one-piece member, where the front side portion is located at an end of the first aperture, and where the one-piece member is configured to bend at a location spaced from the front side portion.

An example method may comprise bending an electronic apparatus housing, where the housing is substantially rigid, where the bending comprises a bending jig bending the housing from a first shape to a second shape, where the bending elastically bends the housing to form an electronic component path of insertion into the housing through a front aperture of the housing, where a shape of the front aperture is resiliently changed by the bending, where the housing comprises a one-piece member forming a unibody including a back, a front and sides between the back and the front with no hinges and which forms an internal electronic component receiving area; inserting an electronic component assembly as a singular module into the housing through the path; and allowing the housing to resiliently deflect back to the first shape, where the housing substantially closes the path, where the electronic component assembly is larger than the front aperture in the first shape of the housing such that the housing prevents full insertion or removal of the electronic component assembly with at the receiving area without the bending of the housing into the second shape.

The shape of the front aperture in the first shape of the housing may be substantially planar, and the shape of the front aperture in the second shape of the housing is curved. Opposite lateral sides of the sides of the housing in the first shape of the housing may be substantially parallel and straight, and the opposite lateral sides in the second shape of the housing are curved. The front aperture may extends 80 percent or less along a length of the front of the one-piece member, and where the sides include opposite lateral sides of the one-piece member extending substantially uninterrupted along opposite lateral sides of the front aperture, where the opposite lateral sides of the one-piece member are resiliently bent for insertion of the electronic component assembly.

In one type of example embodiment the one-piece member 44 is made of polycarbonate having the following properties:

| Mechanical Properties | Metric | English | Comments |
| --- | --- | --- | --- |
| Hardness, Rockwell L | 89 | 89 | ISO 2039-2 |
| Tensile Strength at Break | 56.0 MPa | 8120 psi | 50 mm/min; ISO 527 |
| | 57.0 MPa | 8270 psi | Type I, 50 mm/min; ASTM D 638 |
| Tensile Strength, Yield | 57.0 MPa | 8270 psi | 50 mm/min; ISO 527 |
| | 58.0 MPa | 8410 psi | Type I, 50 mm/min; ASTM D 638 |
| Elongation at Break | 117.9% | 117.9% | Type I, 50 mm/min; ASTM D 638 |
| | 119.4% | 119.4% | 50 mm/min; ISO 527 |
| Elongation at Yield | 5.4% | 5.4% | 50 mm/min; ISO 527 |
| | 5.7% | 5.7% | Type I, 50 mm/min; ASTM D 638 |
| Tensile Modulus | 2.26 GPa | 328 ksi | 50 mm/min; ASTM D 638 |
| | 2.34 GPa | 339 ksi | 1 mm/min; ISO 527 |
| Flexural Yield Strength | 89.0 MPa | 12900 psi | 2 mm/min; ISO 178 |
| | 94.0 MPa | 13600 psi | 1.3 mm/min, 50 mm span; ASTM D 790 |
| Flexural Modulus | 2.14 GPa | 310 ksi | 2 mm/min; ISO 178 |
| | 2.24 GPa | 325 ksi | 1.3 mm/min, 50 mm span; ASTM D 790 |

Please note that this is merely an example, and should not be considered as limiting. In this example, the needed bending force when the described jig is used is about 67 N. From a finite element method (FEM) simulation, not measured, the force at the end of the cover is higher, but this is force on the arm of the bending tool (force 86). Displacement at the end of cover 44 with this force in the simulation was about 12.7 mm; compared to its original, unbend situation.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    bending an electronic apparatus housing member, where the housing member is a substantially rigid one-piece member, where the bending comprises a bending jig bending the housing member from a first shape to a second shape, where the bending elastically bends the housing member to form an electronic component path of insertion into the housing member through a front aperture of the housing member, where a shape of the front aperture is changed by the bending;
    inserting an electronic component assembly as a singular module into the housing member through the path; and
    allowing the housing member to resiliently deflect back to the first shape to prevent the electronic component assembly from exiting the front aperture.

2. A method as in claim 1 where the shape of the front aperture in the first shape of the housing member is substantially planar, and the shape of the front aperture in the second shape of the housing member is curved.

3. A method as in claim 1 where opposite lateral aides of the housing member in the first shape of the housing member are substantially parallel and straight, and the opposite lateral sides in the second shape of the housing member are curved.

4. A method as in claim 1 where the bending comprises no hinges on the housing member allowing the housing member to bend from the first shape to the second shape.

5. A method as in claim 1 where the housing member comprises a front side where the front aperture extends 80 percent or less along a length of the front side, and where opposite lateral sides of the housing member extend substantially uninterrupted along opposite lateral sides of the front aperture, where the opposite lateral sides of the housing member are bent during the bending.

6. A method as in claim 1 where the one-piece member is a unibody having a front side with the front aperture, a rear side, opposite lateral sides and opposite top and bottom sides, where the bending comprises bending the opposite lateral sides.

7. A method as in claim 6 where the rear side has a back aperture therethrough, and where the bending bends the one-piece member at the back aperture.

8. A method as in claim 1 where the one-piece member includes a front side portion at a front side of the one-piece member located at an end of the front aperture, and where the bending is located spaced from the front side portion.

9. An apparatus comprising:
    a housing comprising a one-piece member having a first aperture therethrough into a receiving area inside the housing; and
    an electronic component assembly located inside the housing, where the electronic component assembly is larger than the first aperture, where the electronic component assembly is inserted into the receiving area through the first aperture as a singular module,
    where the one-piece member is substantially rigid,
    and where the one-piece member was resiliently bent to change a shape of the first aperture from a first shape to a different second shape for insertion of the electronic component assembly into the first aperture and the one-piece member was released to allow the one-piece member to resiliently bend back such that the first aperture has the first shape to capture the electronic component assembly in the receiving area and prevent the electronic component assembly from exiting the first aperture.

10. An apparatus as in claim 9 wherein the shape of the first aperture in the first shape is substantially planar, and the shape of the first aperture in the second shape is curved.

11. An apparatus as in claim 9 where the one-piece member comprises opposite lateral sides which are substantially parallel and straight, and the opposite lateral sides are configured to curve when the one-piece member is bent.

12. An apparatus as in claim 9 where the one-piece member comprises no hinges which allow the one-piece member to bend.

13. An apparatus as in claim 9 where the one-piece member comprises a front side where the first aperture extends 80 percent or less along a length of the front side, and where opposite lateral sides of the one-piece member extend substantially uninterrupted along opposite lateral sides of the first aperture, where the opposite lateral sides of the housing member are resiliently bent for insertion of the electronic component assembly.

14. An apparatus as in claim 9 where the one-piece member is a unibody having a front side with the first aperture, a rear side, opposite lateral sides and opposite top and bottom sides, where the one-piece member is configured to bend at the opposite lateral sides to change the first aperture between the first and second shapes.

15. An apparatus as in claim 14 where the rear side has a back aperture therethrough, and where the bending bends the one-piece member at the back aperture.

16. An apparatus as in claim 9 where the one-piece member comprises a front side portion which extends between opposite lateral side walls of the one-piece member, where the front side portion comprises at least 20 percent of a front side of the one-piece member, where the front side portion is located at an end of the first aperture, and where the one-piece member is configured to bend at a location spaced from the front side portion.

17. A method comprising:
bending an electronic apparatus housing, where the housing is substantially rigid, where the bending comprises a bending jig bending the housing from a first shape to a second shape, where the bending elastically bends the housing to form an electronic component path of insertion into the housing through a front aperture of the housing, where a shape of the front aperture is resiliently changed by the bending, where the housing comprises a one-piece member forming a unibody including a back, a front and sides between the back and the front with no hinges and which forms an internal electronic component receiving area;
inserting an electronic component assembly as a singular module into the housing through the path; and
allowing the housing to resiliently deflect back to the first shape to prevent the electronic component assembly from exiting the front aperture.

18. A method as in claim 17 where the shape of the front aperture in the first shape of the housing is substantially planar, and the shape of the front aperture in the second shape of the housing is curved.

19. A method as in claim 17 where opposite lateral sides of the sides of the housing in the first shape of the housing are substantially parallel and straight, and the opposite lateral sides in the second shape of the housing are curved.

20. A method as in claim 17 where the front aperture extends 80 percent or less along a length of the front of the one-piece member, and where the sides include opposite lateral sides of the one-piece member extending substantially uninterrupted along opposite lateral sides of the front aperture, where the opposite lateral sides of the one-piece member are resiliently bent for insertion of the electronic component assembly.

* * * * *